United States Patent Office 2,840,701
Patented June 24, 1958

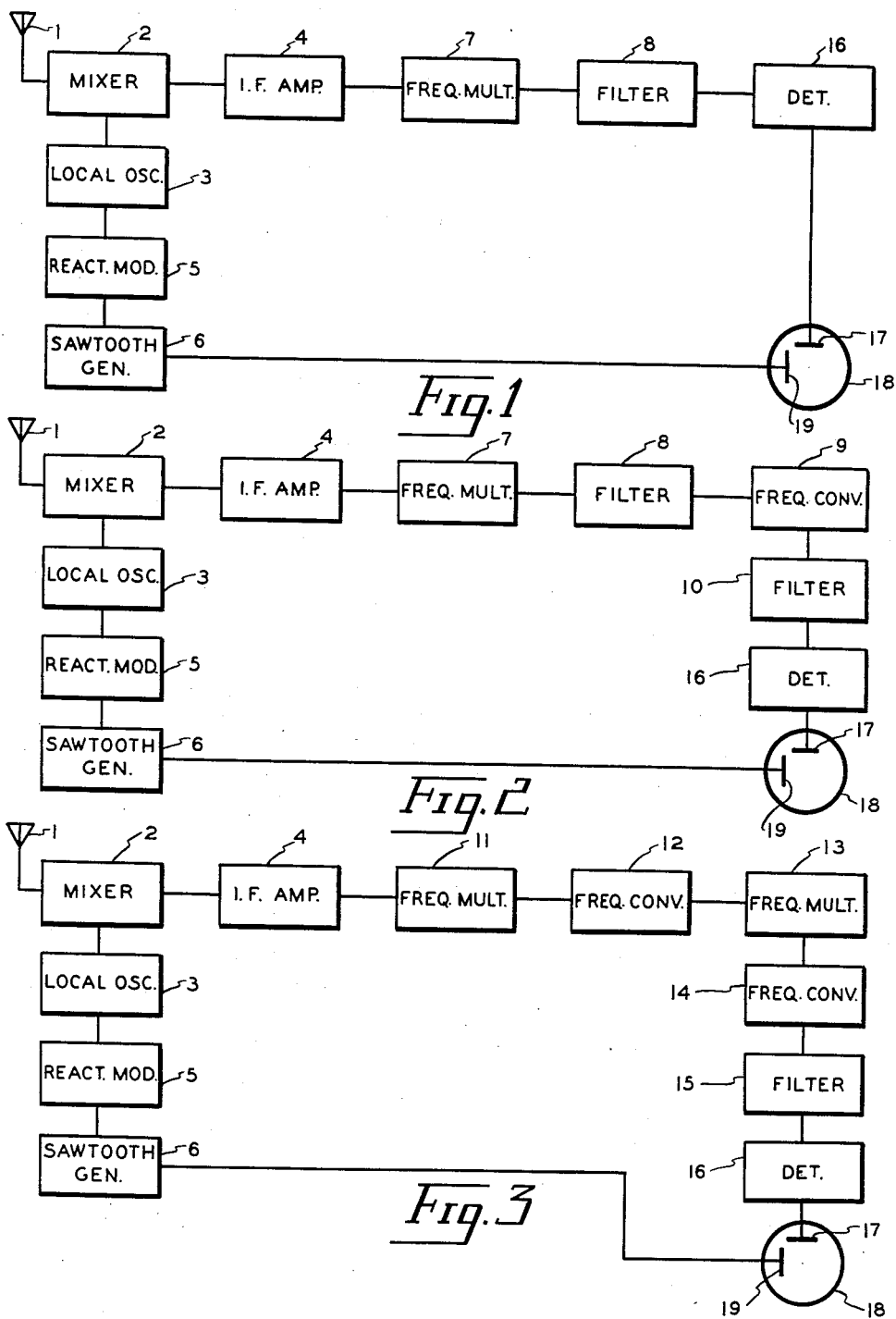

2,840,701
SPECTRUM ANALYZERS

Hyman Hurvitz, Washington, D. C., assignor, by mesne assignments, to Panoramic Radio Products, Inc., Mount Vernon, N. Y., a corporation of New York Application February 28, 1955, Serial No. 490,787

6 Claims. (Cl. 250—20)

The present invention relates generally to spectrum analyzers of the scanning type, and more particularly to scanning spectrum analyzers having provision, including frequency multipliers, for decreasing resolution at a predetermined scanning rate or for permitting an increased scanning rate for a predetermined resolution.

A well known spectrum analyzer is a tunable receiver, of the tuned radio frequency type, or of the superheterodyne type, in which the tuning is periodically varied over a band of frequencies to be analyzed, and in which the output of the receiver is visually displayed against a base line calibratable in terms of frequency. The base line is normally generated on the face of a cathode ray tube by moving the beam of the tube in a first coordinate direction in synchronism with the tuning, while the output of the receiver is utilized to modulate the beam in amplitude, or to deflect the beam in a second coordinate direction.

It is common to define the resolution R of such a spectrum analyzer as the width of the visual response curve due to a single frequency signal, measured in cycles per second, at 3 db down points on the display. Discussing the matter in terms of superheterodyne receiver resolution R cannot be less than the static band width of the I. F. filter of the receiver. However, this minimum resolution is only attainable if the sweep rate $$\frac{df}{dt}$$

in cycles per second per second, is sufficiently low, and in general as $$\frac{df}{dt}$$

increases, so does R, the relationship for optimum response being generally taken to be:

(1) $$R = 1.5\sqrt{\frac{df}{dt}}$$

It is an object of the present invention to decrease the possible resolution R of a scanning spectrum analyzer, for a given scan rate $$\frac{df}{dt}$$

or to increase the possible scan rate $$\frac{df}{dt}$$

for a given resolution R.

More specifically, it is a feature of the present invention to include a frequency multiplier in cascade with the I. F. filter of a superheterodyne spectrum analyzer.

It is another object of the present invention to provide a spectrum analyzer in which the relation between R and $$\frac{df}{dt}$$

is approximately given by $$R = \frac{1.5}{\sqrt{n}}\sqrt{\frac{df}{dt}}$$

where $n$ is a frequency multiplication factor.

Briefly describing the basic elements of the present invention, and relating the invention specifically to a superheterodyne receiver, for example only, a frequency multiplier is inserted in cascade with the I. F. amplifier of the receiver. As the receiver scans, each signal in the I. F. amplifier passes through the I. F. amplifier from one edge of its pass band to the other. We arbitrarily assume the static resolution of a specific I. F. channel of a spectrum analyzer to be $S = f_2 - f_1$, that signals exist at both $f_2$ and $f_1$, and that a sweep rate $$\frac{df}{dt}$$

is adopted which provides an optimum resolution $$R = S = 1.5\frac{df}{dt}, \ = f_2 - f_1$$

This much is conventional design. The output of the I. F. channel is now frequency multiplied by a factor $n$. At the output of the frequency multiplier the sweep rate is $$n\frac{df}{dt}$$

and the frequency separation of the two signals $$f_2, f_1 \text{ is } n(f_2 - f_1)$$

The calculated optimum resolution required at the multiplier is then $$R_1 = 1.5\sqrt{\frac{ndf}{dt}}$$

The step of multiplication has, therefore, had the effect of increasing the frequency separation between signals $f_2$ and $f_1$ by a factor $n$, while requiring an increase of the optimum resolution of the circuit which is attempting to separate the signals by scanning, by a factor $$\sqrt{n}$$

In the event that the output circuit of the frequency multiplier cannot be selected to have the required value of $R_1$ at the multiplied frequency, resort may be had to heterodyning to reduce the latter frequency to a value at which filters of the required low resolution can be built. Heterodyning has no effect on resolution or scan rate.

In the event smaller resolution, or a greater scan rate, is required than is available by virtue of one multiplication, successive stages of multiplication may be employed, with intermediate heterodyne reductions of frequency, to prevent the ultimate multiplied frequency rising to unmanageable or unsuitable values.

The various features of the present invention will become apparent upon consideration of the following detailed description of one specific embodiment thereof, especially when taken in conjunction with the accompanying drawings, wherein:

Figure 1 is a functional block diagram of a simple spectrum analyzer of the frequency scanning type, employing I. F. frequency multiplication to increase resolution for a given scan rate, or scan rate for a given resolution;

Figure 2 is a functional block diagram of a modification of the system of Figure 1, employing frequency conversion to reduce the multiplied I. F. frequency; and Figure 3 is a functional block diagram of a modification of the system of Figure 1, employs a plurality of stages of I. F. multiplication, each stage followed by a stage of frequency reduction.

In the system of Figure 1 the reference numeral 1 denotes an antenna, or other signal source, such as a sonar transducer. The signals inserted are converted to an I. F. frequency by a mixer 2 and local oscillator 3, the I. F. amplifier being 4. The frequency of the local oscillator is continually varied by means of a frequency modulator 5, controlled by a saw-tooth generator 6. This much is conventional in the art of frequency scanning spectrum analysis.

The I. F. amplifier is assumed, for the moment, to have a static resolution S, equal in cycles per second to the width of the selectivity curve of the I. F. amplifier at the half power points. The band of frequencies swept out by the local oscillator is generally far wider than the value S, so that frequencies intercepted by the antenna, or the like, are converted in sequence to the I. F. frequency, and appear at its output. Each converted frequency appears first at one edge of the I. F. band, and varies continuously until it passes beyond the I. F. band at its other edge. If the rate of scan is sufficiently small the curve of output of the I. F. amplifier will be the static selectivity curve of the I. F. amplifier. For higher rates of scan $$\frac{df}{dt}$$

in cycles per second per second, the I. F. amplifier may not be able to respond to the input signal sufficiently rapidly to trace out its selectivity curve, but the response becomes broadened, and is reduced in amplitude. The I. F. amplifier cannot effectively be made as narrow as might be wished, for a given scan rate, but a value should be selected given for optimum response, approximately by $$R = 1.5 \sqrt{\frac{df}{dt}}$$

Here, $$\frac{df}{dt}$$

is the scan rate in cycles per second per second, and may be calculated approximately by multiplying the total scan of the local oscillator 3, multiplied by the number of scans per second. Assume, then, a total scan of 10 mc./s., and a repetition rate of 10 per second $$\frac{df}{dt} = 100 \text{ mc./s./s.}$$

The optimum value for the I. F. amplifier band width is then approximately 15,000 c./s., or $1.5 \sqrt{100{,}000{,}000}$. It is of no avail to reduce the band width of the I. F. amplifier below this value (approximate), in an attempt to increase the resolution of the system.

If, now, a frequency multiplier be inserted in cascade with the I. F. amplifier 4, tuned at its input to the center of the I. F. band, and having an input band width about equal to that of the I. F. amplifier for optimum input response, the output of the multiplier 7 will be, for a multiplication factor $n$, sweeping at $$n\frac{df}{dt}$$

It would appear that resolution has increased by the factor $n$. However, each pair of signals at the input of the multiplier, separated by $\Delta f$, is now separated by $n\Delta f$. The net resolution of the system is therefore reduced by the factor $1/\sqrt{n}$.

Assume the above numerical values, and two signals at the input of the multiplier 7 separated by 15 kc./s. These two signals are separated, at the output of the multiplier, for $n=100$, by 1,500 kc./s. The new optimum resolution is 150,000 c./s., or 150 kc./s. The two signals, which overlapped badly at the input of the multiplier, are now each separated by 1500 kc./s. and the display due to each is only 150 kc./s. wide. There is therefore no semblance of overlap, and the output circuit of the frequency multiplier may be 150,000 c./s. wide.

It is apparent that the output filter 8 of the frequency multiplier, assuming an I. F. mid-frequency of 20 mc./s., will have a mid-frequency of 2,000 mc./s., and will require an optimum band width of .15 mc./s. This represents an undesirably high Q, and also a value of mid-frequency which may be undesirable.

The required Q may be reduced by applying a frequency conversion step-down, following the filter 7 (Figure 2), by means of a frequency converter 9, followed by or having an output filter 10. The converter may reduce the multiplied frequency to 20 mc. mid-frequency, for example, and will still require a band width of .15 mc./s., which is readily available. In such case the width of the filter 8 need not be optimum, as above defined, but may be wider. However, greater resolution cannot be attained than is provided by the filter 8, having regard for the rate of frequency scan through the filter 8.

It follows that for many designs a frequency multiplication of 100 is undesirably great. The same result may be attained by two successive multiplications by 10, each followed by a suitable downward conversion. A system of this type is illustrated in Figure 3, wherein the output of I. F. amplifier 4 is multiplied by a relatively small factor, say 10, in multiplier 11, followed by a downward conversion in converter 12, followed by a further multiplication in multiplier 13, and a further conversion downwards in converter 14, and filter 15. The ultimate conversion may be at the frequency of the original I. F. amplifier 4, or may be omitted entirely.

In each of the systems described the output of the last filter, as 8, 10, 15, is detected in a detector 16, and applied to the vertical plates 17 of a cathode ray oscilloscope 18, while the output of the saw-tooth generator 6 is applied to the horizontal plates 19.

While I have described and illustrated one specific example of the present invention it will be clear that variations of the specific details of construction may be resorted to without departing from the true spirit and scope of the invention as defined in the appended claims.

I claim:

1. In a spectrum analyzer, a source of a wide band of frequencies, a narrow band filter, a scanning frequency converter for converting frequencies of said wide band of frequencies in succession to the frequency of said filter, at a rate of frequency scan $$\frac{df}{dt}$$

a first output filter for said scanning frequency converter, said output filter having a band width of the order of $$1.5\sqrt{\frac{df}{dt}}$$

a frequency multiplier in cascade with said filter, a second output filter for said frequency multiplier, said second output filter having a band width of the order of $$1.5\sqrt{n\frac{df}{dt}}$$

where $n$ is the multiplication factor of said multiplier, means for visually displaying the output of said second filter as a plot against a base line, and means for generating said base line in synchronism with said scanning.

2. A frequency scanning spectrum analyzer comprising a frequency scanning superheterodyne signal receiver including an intermediate frequency amplifier, and a frequency multiplier in cascade with said intermediate frequency amplifier, said frequency multiplier having an output pass band width of the order of $$1.5\sqrt{\frac{df}{dt}}$$

where $$\frac{df}{dt}$$

is the rate of frequency change in cycles per second caused by said scanning in said frequency multiplier.

3. In a system for separating signals of adjacent frequency by a frequency scanning process, means for heterodyning said signals in succession to a first fixed frequency, means for frequency multiplying said first fixed frequency, and means for plotting the product of said means for frequency multiplying against a frequency representative base line.

4. A frequency scanning system comprising a frequency scanning frequency converter having an output circuit, a frequency multiplier in cascade with said output circuit, said frequency multiplier having a tuned output circuit, an indicator having means for translating an indication in synchronism with said frequency scanning, and means for modulating the amplitude of said indication in accordance with the amplitude of output signal in said tuned output circuit of said frequency multiplier.

5. The combination in accordance with claim 4 wherein the pass band of said output circuit of said tuned output circuit is of the order of 1.5 $\sqrt{df/dt}$, where $\sqrt{df/dt}$ is the rate of frequency scan in cycles per second of signals in said tuned output circuit responsive to said frequency scanning.

6. The combination in accordance with claim 5 wherein is further provided a frequency converter for reducing the frequency of signals in said tuned output circuit, said frequency converter connected in cascade between said output circuit and said indicator.

References Cited in the file of this patent

UNITED STATES PATENTS

| | | |
|---|---|---|
| 2,304,969 | Trevor | Dec. 15, 1942 |
| 2,404,333 | Whalley | July 16, 1946 |
| 2,513,763 | Vilkomerson | July 4, 1950 |
| 2,572,216 | Taylor | Oct. 23, 1951 |
| 2,579,160 | Stribling et al. | Dec. 18, 1951 |

OTHER REFERENCES

Guillemin, Communication Networks, Wiley, New York, 1935 vol. 2, page 487. Copy in Div. 69.